United States Patent
Haberland et al.

(10) Patent No.: US 10,830,184 B2
(45) Date of Patent: Nov. 10, 2020

(54) CONTROL DIAPHRAGM FOR DIAPHRAGM CARBURETOR

(71) Applicant: DÄTWYLER SCHWEIZ AG, Schattdorf (CH)

(72) Inventors: Norbert Haberland, Euskirchen (DE); Maria del Mar Diez Diaz, Freienbach (CH); Bruno Gisler, Altdorf (CH)

(73) Assignee: Dätwyler Schweiz AG, Schattdorf (CH)

( * ) Notice: Subject to any disclaimer, the term of this patent is extended or adjusted under 35 U.S.C. 154(b) by 233 days.

(21) Appl. No.: 16/069,004

(22) PCT Filed: Jan. 4, 2017

(86) PCT No.: PCT/EP2017/050133
§ 371 (c)(1),
(2) Date: Jul. 10, 2018

(87) PCT Pub. No.: WO2017/121668
PCT Pub. Date: Jul. 20, 2017

(65) Prior Publication Data
US 2018/0328314 A1    Nov. 15, 2018

(30) Foreign Application Priority Data
Jan. 11, 2016    (CH) ..................... 00038/16

(51) Int. Cl.
*F02M 17/04*    (2006.01)
*F02M 17/40*    (2006.01)
(Continued)

(52) U.S. Cl.
CPC ......... *F02M 17/04* (2013.01); *B01F 3/04021* (2013.01); *F02M 17/40* (2013.01); *F16J 3/02* (2013.01); *F04B 43/0054* (2013.01)

(58) Field of Classification Search
CPC . F02M 17/04; F02M 17/40; F16J 3/02; B01F 3/04021
See application file for complete search history.

(56) References Cited

U.S. PATENT DOCUMENTS 4,837,068 A    6/1989    Martin et al.
4,978,478 A    12/1990    Vonderau et al.
(Continued)

FOREIGN PATENT DOCUMENTS

DE        3827555 A1    2/1990
DE    101 42 247 A1    3/2002
(Continued)

OTHER PUBLICATIONS

International Preliminary Report on Patentability dated Jul. 17, 2018 for PCT/EP2017/050133 filed Jan. 4, 2017.
(Continued)

*Primary Examiner* — Robert A Hopkins
(74) *Attorney, Agent, or Firm* — Paul D. Bianco; Gary S. Winer; Fleit Intellectual Property Law

(57) ABSTRACT

A control diaphragm for controlling fuel supply in a carburetor of an internal combustion engine includes a functional region enclosing a sensing region concentrically and a peripheral fastening border for fastening the control diaphragm in the diaphragm carburetor. The control diaphragm closes a control chamber of the diaphragm carburetor and is operatively connected via the central sensing region to a control lever in the control chamber and senses the axial deflection of the sensing region in a manner dependent on operation-induced pressure change in the control chamber. The control diaphragm consists in one piece of temperature-resistant and fuel-resistant, non-elastomeric plastic and the functional region is configured by way of a multiplicity of concentric corrugations. The outermost corrugation directly adjoins the fastening border, and the radius of the outermost
(Continued)

corrugation corresponds substantially to the radius of the control chamber. The sensing region directly adjoins the innermost corrugation and the radius of the sensing region corresponds to from 5 to 25% of the outer radius of the functional region.

20 Claims, 6 Drawing Sheets

(51) Int. Cl.
    *B01F 3/04*    (2006.01)
    *F16J 3/02*    (2006.01)
    *F04B 43/00*    (2006.01)

(56) References Cited

U.S. PATENT DOCUMENTS

| | | |
|---|---|---|
| 5,140,733 A | 8/1992 | Shimada et al. |
| 5,262,092 A | 11/1993 | Reeder et al. |
| 5,487,861 A | 1/1996 | Reeder et al. |
| 6,446,939 B1 | 9/2002 | Hoppe et al. |
| 7,905,172 B2 | 3/2011 | Öhrle et al. |
| 9,027,910 B2 | 5/2015 | Braun et al. |
| 9,371,925 B2 * | 6/2016 | Vasquez ............ G05D 16/0663 |
| 9,567,944 B2 | 2/2017 | Pattullo et al. |
| 2003/0047818 A1 | 3/2003 | Nagata |
| 2008/0020178 A1 | 1/2008 | Öhrle |
| 2017/0211514 A1 | 7/2017 | Gisler et al. |

FOREIGN PATENT DOCUMENTS

| | | |
|---|---|---|
| DE | 20 2005 020 877 U1 | 9/2006 |
| EP | 0396755 A1 | 11/1990 |
| EP | 0608490 A1 | 8/1994 |
| EP | 1286040 A2 | 2/2003 |
| EP | 1892414 A1 | 2/2008 |
| FR | 1328068 A | 5/1963 |
| FR | 2418352 A1 | 9/1979 |
| WO | 2014/018723 A1 | 1/2014 |
| WO | 2016/012233 A1 | 1/2016 |

OTHER PUBLICATIONS

Written Opinion dated Feb. 21, 2017 for PCT/EP2017/050133 filed Jan. 4, 2017.
International Search Report dated Feb. 10, 2017 for PCT/EP2017/050133 filed Jan. 4, 2017.
Written Opinion for PCT/EP2017/050133 filed Jan. 4, 2017.

* cited by examiner

CONTROL DIAPHRAGM FOR DIAPHRAGM CARBURETOR

TECHNICAL FIELD

The invention relates to a control diaphragm for controlling a supply of fuel in a diaphragm carburetor of an internal combustion engine.

TECHNOLOGICAL BACKGROUND

Diaphragm carburetors are chiefly used in hand-held devices, such as for example chainsaws, or in model aeroplanes, which in each case have to function independently of position. Known control diaphragms are produced from a fabric-reinforced rubber (e.g. DE202005020877) and comprise centrally in a central sensing region a riveted circular reinforcing plate (EP0608490 and U.S. Pat. No. 9,027,910). An example of such a control diaphragm is shown in FIGS. 1 to 3. The control diaphragm is held with a circumferential fastening border 3 in the carburetor housing and closes a control chamber 5 in a sealing manner. Arranged in the control chamber is a spring-loaded control lever 4, which in the region of reinforcing plate 6 presses against central sensing region 1 of the control diaphragm and thus senses a diaphragm stroke or an axial deflection of sensing region 1. Control chamber 5 is connected to a carburetor chamber of the diaphragm carburetor. The side of the control diaphragm facing away from the control chamber is exposed to ambient pressure. During the operation of the carburetor, an underpressure in the range of a few millibars arising in the carburetor chamber or in the control chamber brings about a diaphragm stroke in the tenth of a millimetre to the single digit millimetre range of central sensing region 1, which is sensed by control lever 4 in order to control the supply of fuel. To increase the maximum diaphragm stroke, the control diaphragm comprises a peripheral corrugation 8 enclosing reinforcing plate 6 circumferentially. A fabric-reinforced rubber diaphragm with a riveted or glued reinforcing plate is known from EP1286040, which comprises at least two circumferential corrugations in the functional region for a greater diaphragm stroke.

The riveted or glued reinforcing plate, which in the case of all known control diaphragms has a radius of over 50% of the radius up to circumferential fastening border 3, reinforces an extensive inner region of the control diaphragm. The reinforcing plate brings about a uniform diaphragm stroke over the region covered by the reinforcing plate (see arrows in FIG. 3). That is to say that this relatively large central sensing region oscillates in the ideal case uniformly in the axial direction. Under real conditions, however, reinforcing plate 6 tends towards "fluttering" or wobbling, i.e. reinforcing plate 6 can easily become inclined out of the diaphragm plane, in particular in the case of rapid positional changes of the carburetor, which can lead to irregularities of the carburetor control during operation. These position-dependent irregularities are also increased by the mass of reinforcing plate 6. The diaphragm is also often installed inverted in the carburetor, which however increases the "flutter" or wobbling.

A further problem of the known control diaphragms consists in the fact that the rubber coating comes into contact with fuel or fuel vapours during operation of the engine. This leads to swelling of the rubber layer. During the engine standstill, the rubber layer dries and goes down again. Both processes take place randomly, but also influence the response and control behaviour of the control diaphragm. Furthermore, frequent swelling and drying leads to increased crack formation in the rubber layer.

The production of such a control diaphragm is also a multi-stage process, as a result of which residual stresses, e.g. from the processed textile and rubber materials, relatively often remain to a varying extent and randomly distributed in the control diaphragm. These influence the control behaviour in an uncontrollable manner. Furthermore, a control diaphragm with a riveted reinforcing element is susceptible to leakages and crack formation.

In order to partially overcome the above problems, a one-part control diaphragm made of fuel-resistant polytetrafluoroethylene (PTFE) was proposed in DE3827555. Instead of the riveted reinforcing plate, the latter comprises a reinforcement part which is either integrally moulded directly on the control diaphragm or is connected to the control diaphragm by welding or gluing. However, this reinforcing plate also has a radius of well over 50% of the diaphragm radius. The problem of the "fluttering" and of the position-dependent irregularities is therefore only solved in an unsatisfactory manner on account of the relatively high mass due to the reinforcing plate or the reinforcement part. This solution has not been successful on the market.

A further control diaphragm is known from WO2014018723. The latter comprises a multi-layer structure with a continuous layer and an interrupted layer. The continuous layer closes the control chamber in a sealing manner and reacts to the pressure changes in the control chamber. The entire flexibility of the multi-layer control diaphragm is greatly dependent on the shape of the interrupted layer, which for example is constituted as a helical spring. In the central sensing region, the control diaphragm comprises a reinforcement body. This control diaphragm is also relatively expensive in production. In addition, any deposits between the two layers can lead to irregularities during the operation of the carburetor.

Measurements on a known control diaphragm comprising a rubber-coated fabric and a riveted reinforcing plate exhibit a pressure-displacement characteristic (i.e. a deflection of the sensing region as a function of the pressure difference in the control chamber) which flattens out markedly from an underpressure of approximately 4 millibars (see FIG. 7A). That is to say that, in the case of the operation-induced underpressures of 4 to 8 millibars, the control sensitivity is greatly reduced.

SUMMARY OF THE INVENTION

One aspect of the invention relates to a control diaphragm which can address the aforementioned problems. In some embodiments, the position-dependent irregularities during the operation of the carburetor are to be prevented. Furthermore, a deflection that is as linear as possible over the entire underpressure range occurring here is to be made possible.

In one embodiment, the control diaphragm for controlling a supply of fuel in a diaphragm carburetor of an internal combustion engine comprises a central sensing region, a functional region enclosing the sensing region concentrically and a peripheral fastening border for fastening the control diaphragm in the diaphragm carburetor. In the installed state, the control diaphragm closes a control chamber of the diaphragm carburetor in a sealing manner. The control diaphragm is operatively connected via the central sensing region to a control lever of the diaphragm carburetor arranged in the control chamber, which control lever senses the axial deflection of the sensing region in a manner which is dependent on an operation-induced pressure change in the control chamber and thus controls the supply of fuel. The control diaphragm consists in one piece of temperature-resistant and fuel-resistant, non-elastomeric plastic. The functional region is constituted by a multiplicity of concentric corrugations between the fastening border and the sensing region, wherein the outermost concentric corrugation directly adjoins the fastening border and the radius of the outermost concentric corrugation essentially corresponds to the radius of the control chamber. The sensing region directly adjoins the innermost concentric corrugation of the functional region and the radius of the sensing region amounts to 5 to 25% of the outer radius of the functional region. Furthermore, the sensing region comprises a reinforcing means, which reduces any pressing of the control lever into the sensing region by very thin control diaphragms.

The functional region defines the region of the control diaphragm which primarily establishes the flexibility and stretching capacity of the control diaphragm. With a multiplicity of concentric deformations in the functional region, the flexibility and stretching capacity of the plastic is influenced in such a way that the bending behaviour (flattening of the corrugations) of the control diaphragm dominates over material stretching inside the diaphragm. This even permits an essentially linear deflection with respect to the operation-induced pressure change in the control chamber or an essentially linear displacement-pressure characteristic. In the case of the known rubber-coated control diaphragms, the material stretching inside the diaphragm dominates, so that the increase in the deflection with an increasing underpressure markedly diminishes (non-linear displacement-pressure characteristic). An approximately linear displacement-pressure characteristic is not possible. It has been shown in simulations that, by varying the number of corrugations and the corrugation geometry (wavelength, amplitude) in the radial direction, the response behaviour of the control diaphragm can be adjusted almost arbitrarily between a non-linear displacement-pressure characteristic (dominance of the material stretching) up to a linear displacement-pressure characteristic (dominance of the bending behaviour).

The functional region of the control diaphragm extends over virtually the entire control chamber and the inner sensing region has a radius of only approximately 5 to 25% of the radius of the control chamber or of the outer radius of the functional region. In the case of the known diaphragms, the functional region extends only over a narrow peripheral region of the diaphragm along the edge of the control chamber.

The reinforcing means in the sensing region thus extends only over a small central region of the entire control diaphragm, i.e. only over the inner 5% to 25% related to the outer radius of the functional region or the radius of the control chamber, as a result of which the mass of the control diaphragm, even with a moulded thickening of the sensing region, can be significantly reduced compared to the known control diaphragms.

The reinforcing means can be constituted by a thickening of the sensing region (integrally moulded reinforcing means), wherein the thickness of the sensing region corresponds to to 12 times, preferably 4 to 8 times, the diaphragm thickness in the functional region. The sensing region can have a maximum thickness of 10 to 500 micrometres, preferably 20 to 300 micrometres. The thickness of the diaphragm in the functional region can be 5 to 200 micrometres, preferably 10 to 50 micrometres. Such a thickening is advantageous especially in the case of very thin control diaphragms and, on account of the small sensing region, leads to only a small increase in mass.

The thickness can be selected depending on the shape of the control lever. If the control lever as a small point-shaped contact surface, the sensing region of the control diaphragm will be selected thicker. If the control lever has a plate-shaped contact surface, which contacts a larger part of the sensing region, the thickness of the sensing region can be smaller.

The thickening can be arranged such that the control diaphragm thickens in both directions in the transition from the functional region into the sensing region, or it can be arranged on the side facing away from or facing towards the control lever.

The entire control diaphragm can however also be constituted essentially with a uniform thickness and, in the sensing region, can comprise radial reinforcing ribs (integrally moulded reinforcing means) or radial reinforcing corrugations (moulded-in reinforcing means) as reinforcing means. In contrast with the reinforcing ribs, the reinforcing corrugations are wave-shaped "embossments" as in the case of the corrugations in the functional region.

Reinforcing ribs can have a maximum height of 10 to 500 micrometres, preferably 20 to 300 micrometres, with respect to the plane of the sensing region or the diaphragm plane. Reinforcing corrugations can have a maximum height or depth also of 10 to 500 micrometres, preferably 20 to 300 micrometres. The latter can also be arranged on the side facing away from or facing towards the control lever. If the side of the sensing region facing towards the control lever is not constituted flat (e.g. in the case of reinforcing ribs or corrugations), such a control diaphragm is preferably used together with a control lever which comprises a circular, flat sensing plate. The sensing region and the sensing plate are preferably matched to one another, so that the diameter of the sensing plate corresponds to 50 to 100% of the diameter of the sensing region.

In some embodiments, four to ten concentric corrugations are formed in the functional region. The concentric corrugations can be constituted as concentric circles or concentric polygons.

In some embodiments, the concentric corrugations can be combined in the functional region with radial deformations or radial reinforcing ribs, which preferably extend only over the innermost concentric corrugations. That is to say that a plurality of radial reinforcing ribs are constituted in the functional region, which preferably start at the outer edge of the sensing region and run radially or ray-shaped outwards as in the functional region. Depending on the desired reinforcement, the length and number of the reinforcing ribs can be varied. The number can vary between 3 and 12 reinforcing ribs. Good results have been obtained with 6 reinforcing ribs. Normally, the reinforcing ribs extend only over the innermost, concentric corrugations, i.e. up to roughly the middle of the functional region. The inner functional region is reinforced compared to the outer functional region. The reinforcement brings about a stabilisation of the sensing region with regard to undesired tilting. The reinforcing ribs are formed, like the concentric corrugations before, in the form of corrugations in the control diaphragm. A reinforcement without an increase in the mass is thus achieved.

Normally, the concentric corrugations are constituted wave-shaped in the radial direction. The corrugations constituted wave-shaped in the radial direction can have an amplitude (wave crest to wave trough) of 0.2 to 1.0 millimetres and/or a wavelength of 1.0 to 2.5 millimetres. Normally, the wavelength and the amplitude are constant over the entire functional region. The wavelength can however also increase towards the central sensing region and/or the amplitude can diminish towards the central sensing region, in order to increase the flexibility of the control diaphragm towards the central sensing region. In addition, the flexibility can be influenced by the thickness of the control diaphragm.

The control diaphragm is fixed with its fastening border in a carburetor, so that the sensing region and the functional region define an active exposed region of the control diaphragm which can react to pressure changes in the control chamber.

In some embodiments, the radius of the sensing region amounts to less than 20%, preferably less than 15%, of the inner radius of the fastening border (or of the active region of the control diaphragm) and/or of the outer radius of the functional region. Viewed in the radial direction, the functional region extends over at least 80% of the active region of the control diaphragm. The radius of the central sensing region can amount to 1 to 5 millimetres. The inner radius of the functional region can amount to 1 to 5 millimetres and the outer radius of the functional region can amount to 10 to 30 millimetres.

In some embodiments, the control diaphragm is made of a non-elastomeric plastic with a temperature resistance of at least 150°. The plastic preferably has a modulus of elasticity (DIN EN ISO 527) of more than 800 N/mm$^2$, more preferably more than 2500 N/mm$^2$. The plastic can be selected from the group of polybenzimidazole (PBI), polyimides (PI), thermoplastic polyimides (TPI), polyamide-imide (PAI), polyether sulphone (PES), polyphenyl sulphone (PPSU), polyether imide (PEI), polysulphone (PSU), polyether ketone (PEK), polyaryletherketone (PAEK), polyphenylene sulphide (PPS), perfluoroalkoxy polymer (PFA), ethylene tetrafloroethylene (ETFE), polychlorine trifloroethylene (PCTFE), polyvinylidene fluoride (PVDF), polybutylene terephthalate (PBT), polyetheretherketone (PEEK) or combinations thereof. A chemically resistant, in particular a fuel-resistant plastic is preferably selected.

The control diaphragm has no mass increase in the centre, or only a small increase relative to the total mass, which during operation (e.g. in a diaphragm carburetor) does not lead to any position-dependent irregularities. A further considerable advantage consists in the simple production, since the control diaphragm can be produced by means of thermoforming of film material or by means of injection moulding.

Furthermore, the invention relates to a diaphragm carburetor with a control diaphragm according to the invention and the use of the control diaphragm according to the invention in a diaphragm carburetor.

BRIEF DESCRIPTION OF THE FIGURES

The invention is to be explained in greater detail below on the basis of examples of embodiment in connection with the drawing. In the figures.

WAYS OF PERFORMING THE INVENTION

Figure 1:
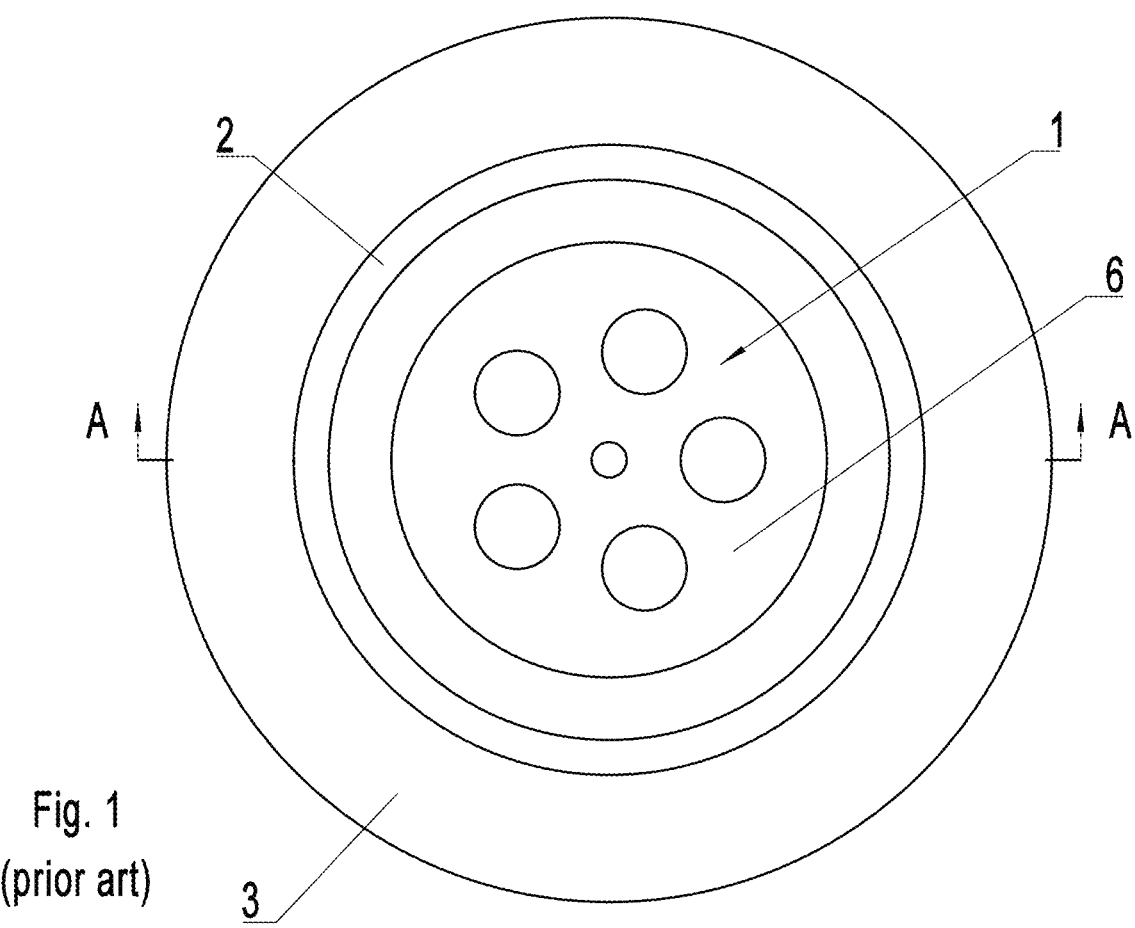
FIG. 1 shows a plan view of a known control diaphragm with a riveted reinforcing plate.
Figure 2:
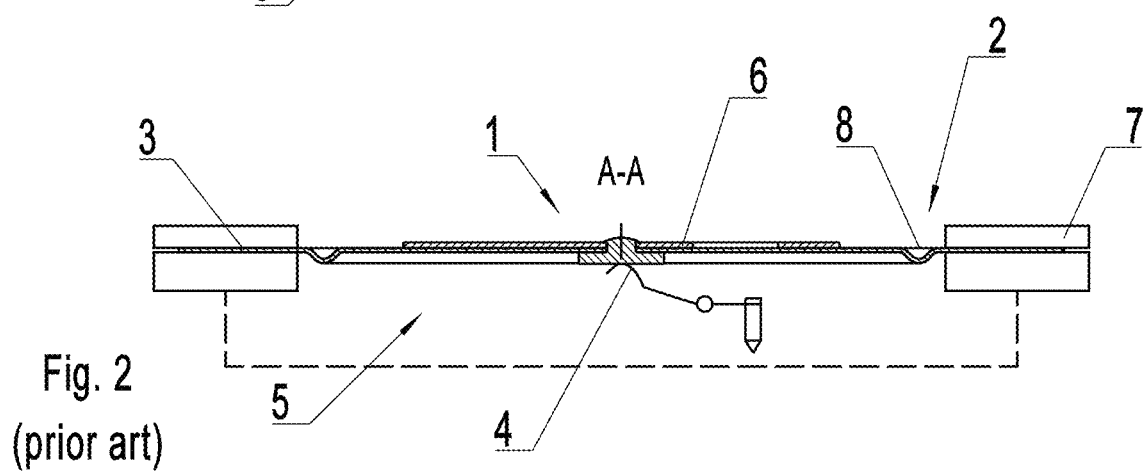
FIG. 2 shows a cross-sectional representation of the control diaphragm from FIG. 1 in the installed state.
Figure 3:
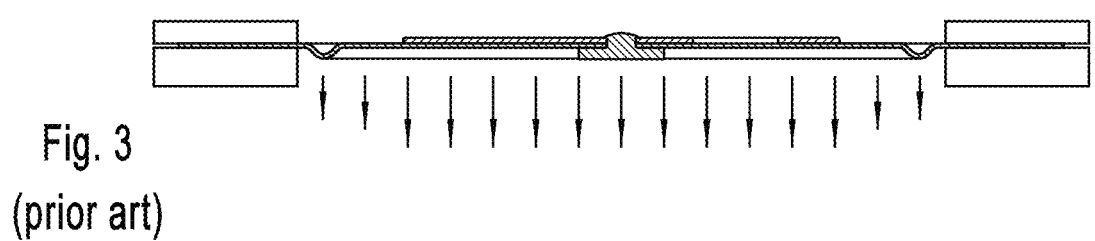
FIG. 3 shows a cross-sectional representation of the control diaphragm from FIG. 1 with a diagrammatic representation of the deflection.

A control diaphragm known from the prior art is shown in FIGS. 1 to 3. FIG. 1 shows the control diaphragm in a plan view. FIG. 2 shows a cross-sectional representation of the control diaphragm from FIG. 1 in the installed state. A control chamber and a control lever are represented diagrammatically.

The control diaphragm made of a rubber-coated fabric comprises in the centre a disc-shaped riveted reinforcing plate 6, which forms a central sensing region 1 of the control diaphragm. Adjoining sensing region 1, the control diaphragm also comprises a functional region 2 formed by a circumferential peripheral corrugation 8, which is bordered by a fastening border 3. The control diaphragm is held by fastening border 3 in fastening means 7 of a diaphragm carburetor and closes a control chamber 5 (dashed lines) in a sealing manner. Arranged in control chamber 5 is a control lever 4, which can sense the diaphragm stroke of the control diaphragm and thus controls the supply of fuel for the diaphragm carburetor. As already described, reinforcing plate 6 brings about a uniform diaphragm stroke over the region covered by the reinforcing plate (see arrows in FIG. 3). In the ideal case, the region covered by the reinforcing plate oscillates uniformly in the axial direction. Under real conditions, however, reinforcing plate 6 tends to "flutter" or wobble, i.e. reinforcing plate 6 can become tilted slightly out of the diaphragm plane, especially in the presence of rapid positional changes of the carburetor, which can lead to irregularities of the carburetor control during operation.

Figure 7A:
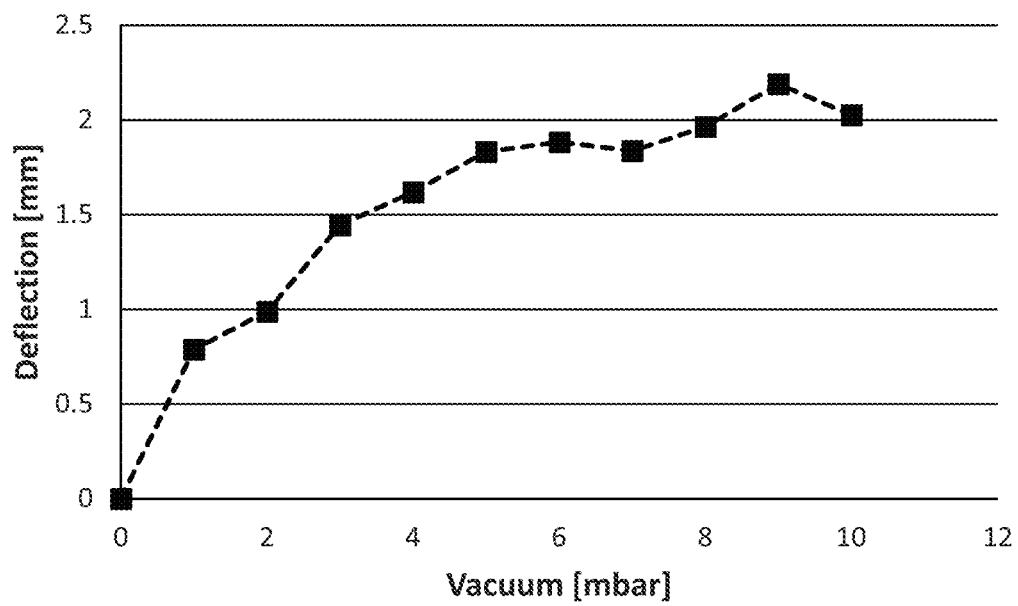
FIGS. 7A & 7B show displacement-pressure diagrams of a known control diaphragm (FIG. 7A) and of control diaphragms according to the invention (FIG. 7B)

A measurement of the displacement-pressure characteristic of the known diaphragm from FIG. 1 is represented in FIG. 7A. The curve flattens out markedly from a pressure change of approximately 4 millibars, so that the control sensitivity from 4 millibars underpressure is markedly reduced.

Figure 4:
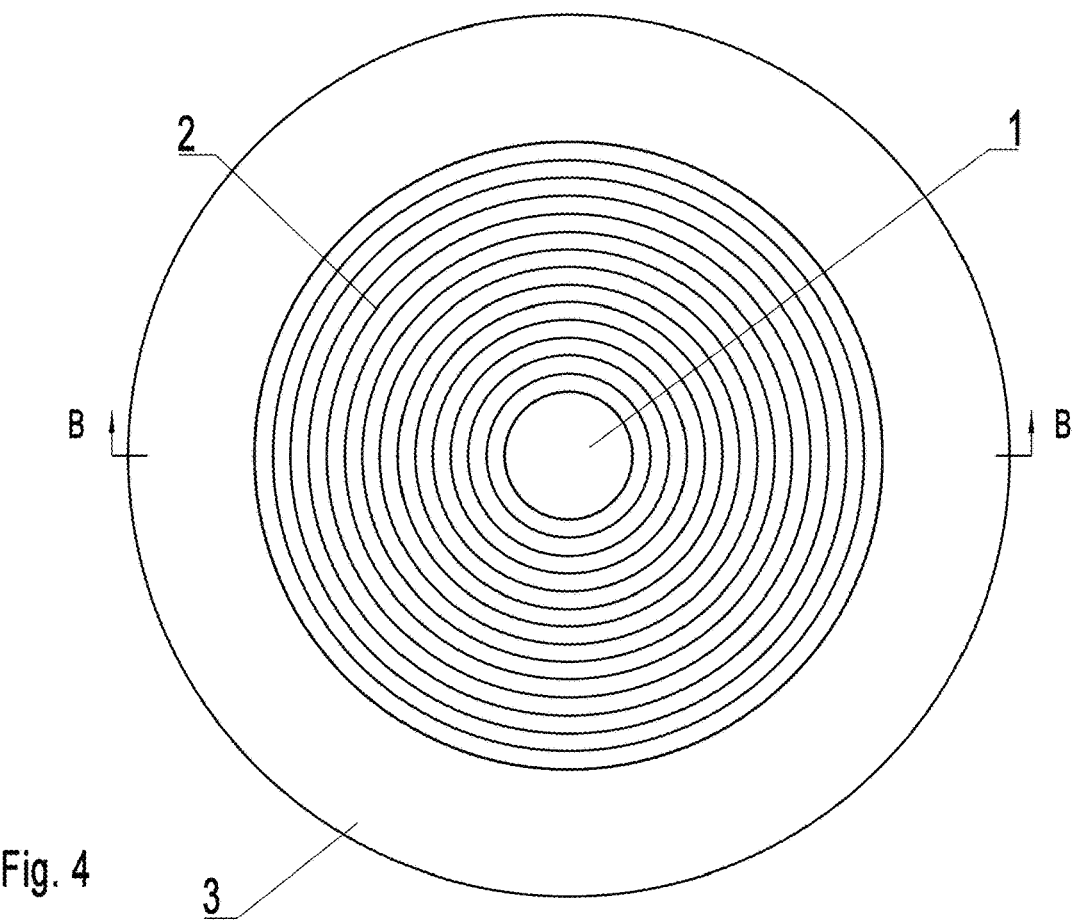
FIG. 4 shows a plan view of a control diaphragm according to the invention.
Figure 5:
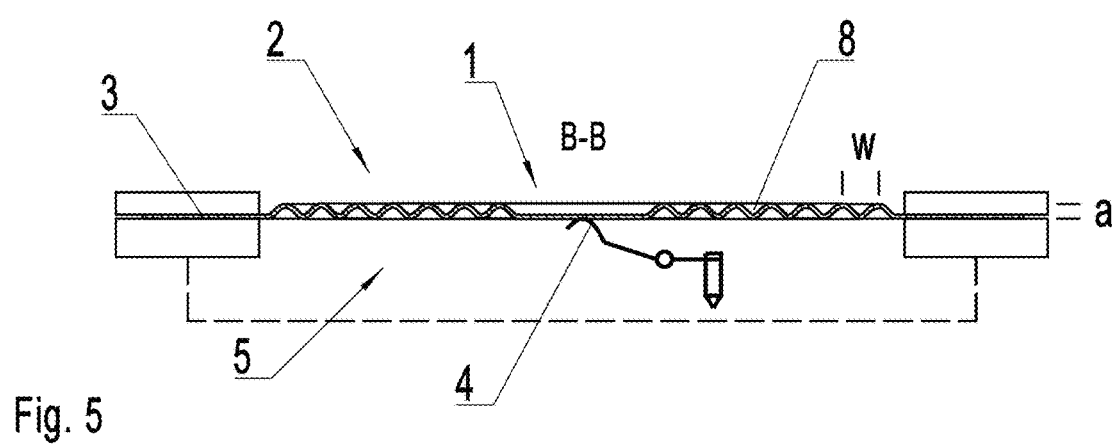
FIG. 5 shows a cross-sectional representation of the control diaphragm from FIG. 4 in the installed state.
Figure 6:
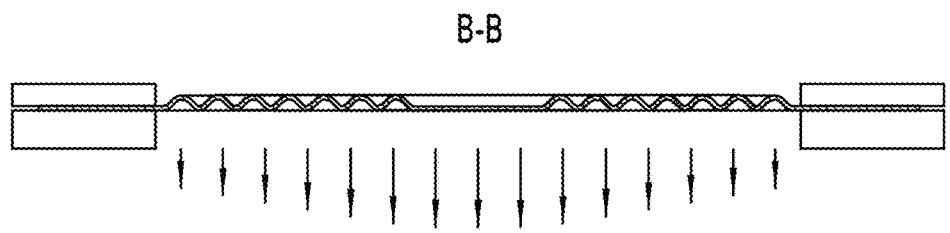
FIG. 6 shows a cross-sectional representation of the control diaphragm from FIG. 4 with a diagrammatic representation of the deflection.

An embodiment of a control diaphragm with a multiplicity of concentric corrugations is shown in FIGS. 4 to 6. The control diaphragm has a thickness of approximately 20 to 100 micrometres. The plastic with a heat resistance of at least 150° C. is used for the control diaphragm, selected from the group of polybenzimidazole (PBI), polyimides (PI), thermoplastic polyimides (TPI), polyamide-imide (PAI), polyether sulphone (PES), polyphenyl sulphone (PPSU), polyether imide (PEI), polysulphone (PSU), polyether ketone (PEK), polyaryletherketone (PAEK), polyphenylene sulphide (PPS), perfluoroalkoxy polymer (PFA), ethylene tetrafloroethylene (ETFE), polychlorine trifloroethylene (PCTFE), polyvinylidene fluoride (PVDF), polybutylene terephthalate (PBT), polyetheretherketone (PEEK) or combinations thereof. Good results have been obtained with a PEEK film with a thickness of 25 micrometres (see FIG. 7B).

The control diaphragm comprises a sensing region 1, a functional region 2 and a fastening border 3. Sensing region 1 and functional region 2 define the active exposed region of the control diaphragm, which is deflected on account of pressure changes in control chamber 5. The control diaphragm is held in a sealing manner in fastening means 7 of the carburetor by means of fastening border 3. A control lever 4 arranged in control chamber 5 senses the deflection of sensing region 1 of the control diaphragm and thus controls the supply of fuel in the carburetor.

In the embodiment shown, sensing region 1 has a radius of less than 20% of the radius of the active region of the control diaphragm. The remaining part of the active region is constituted by functional region 2. Especially in the case of an embodiment in which a reinforcing means is constituted as a thickening (see FIGS. 9A & 9B and 10A & 10B), only a small mass is added to the control diaphragm with the small radius of the sensing region relative to the outer radius of the functional region or the radius of the control chamber.

In the embodiment shown, seven concentric, circular corrugations are formed in the control diaphragm in functional region 2. The concentric corrugations are constituted wave-shaped with a constant wavelength w and amplitude a in the radial direction. The wave-shaped corrugations increase the flexibility and stretching capacity of the control diaphragm in functional region 2. During operation of the carburetor, the generated underpressure in the control chamber brings about a deflection of the control diaphragm, wherein the maximum diaphragm stroke in central sensing region 1 is at a maximum. On the other hand, sensing region 1 of the control diaphragm, said sensing region being constituted flat, experiences a curvature on account of the, in itself, relatively stretch-free control diaphragm and the reinforcing means.

The flexibility of the control diaphragm is influenced by the concentric corrugations in such a way that the maximum deflection is directed in a controlled manner towards the central sensing region, which is selected small, such that no wobbling movements can arise—such as occur with the known control diaphragms with a stiff oscillating plate and a merely peripheral functional region.

Simulations have shown that the rigidity of the control diaphragm increases with increasing amplitude and increasing thickness and diminishes with increasing wavelength. By varying the number of corrugations and the corrugation geometry (wavelength, amplitude) in the radial direction, the response behaviour of the control diaphragm can thus be adjusted almost arbitrarily between a non-linear displacement-pressure characteristic (dominance of the material stretching) up to a linear displacement-pressure characteristic (dominance of the bending behaviour).

Figure 7B:
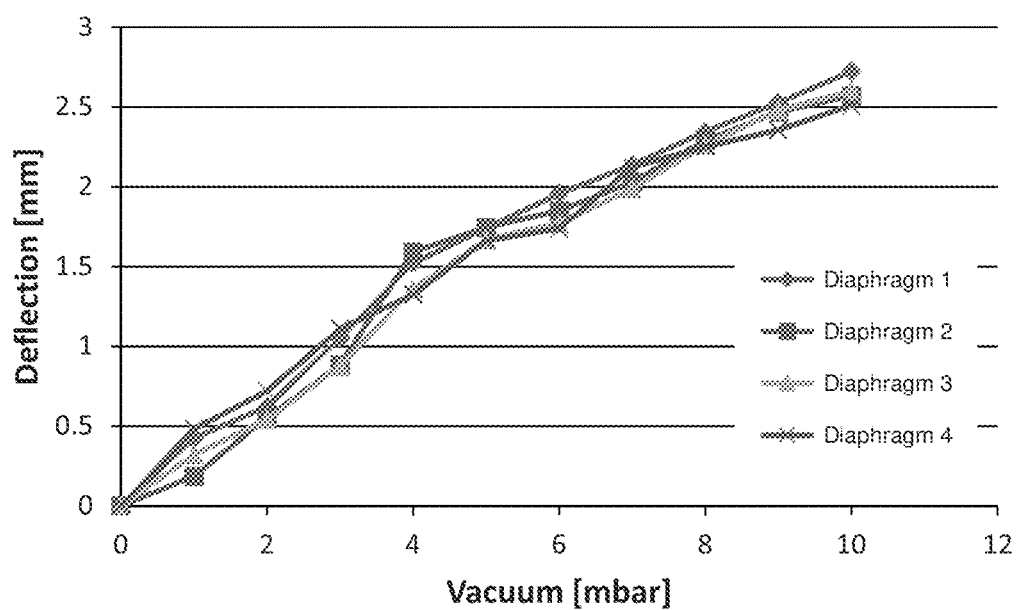

The number of corrugations and their amplitudes a and wavelengths w can be selected such that the axial deflection of sensing region 1 runs essentially linear depending on the operation-induced pressure change in control chamber 5. An example of such a course is shown in FIG. 7B. FIG. 7B shows the measurement data of four control diaphragms, which have been produced from a PEEK film with a thickness of 25 micrometres. Functional region 2 comprises in each case seven circular corrugations 8, which are constituted wave-shaped in the radial direction. The amplitude amounts to approximately 0.44 millimetres and wavelength w amounts to approximately 1.6 millimetres. The radius of sensing region 1 is approximately 3 millimetres in size. The outer radius of functional region 2 is approximately 12.5 millimetres in size.

Figure 8A:
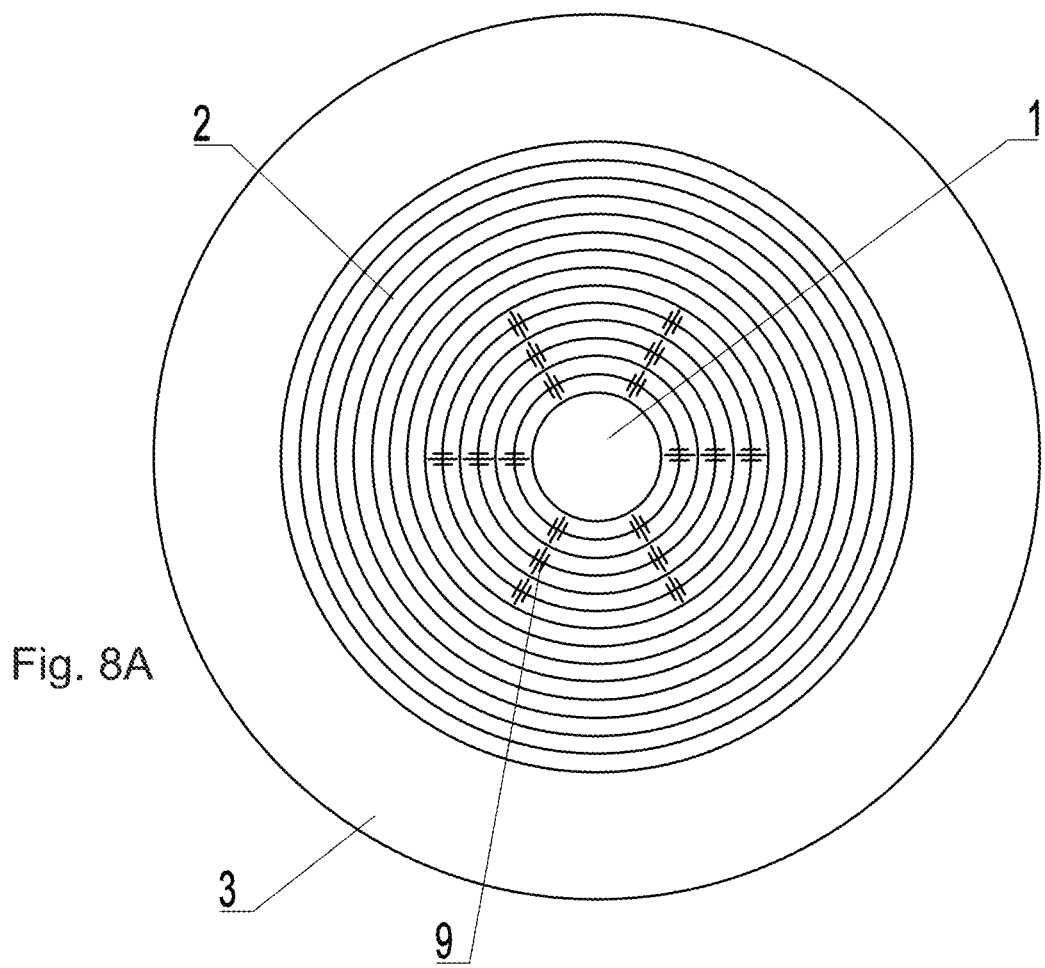
FIGS. 8A & 8B show a plan view (FIG. 8A) and a perspective view (FIG. 8B) of a control diaphragm according to the invention with radial reinforcing ribs.
Figure 8B:
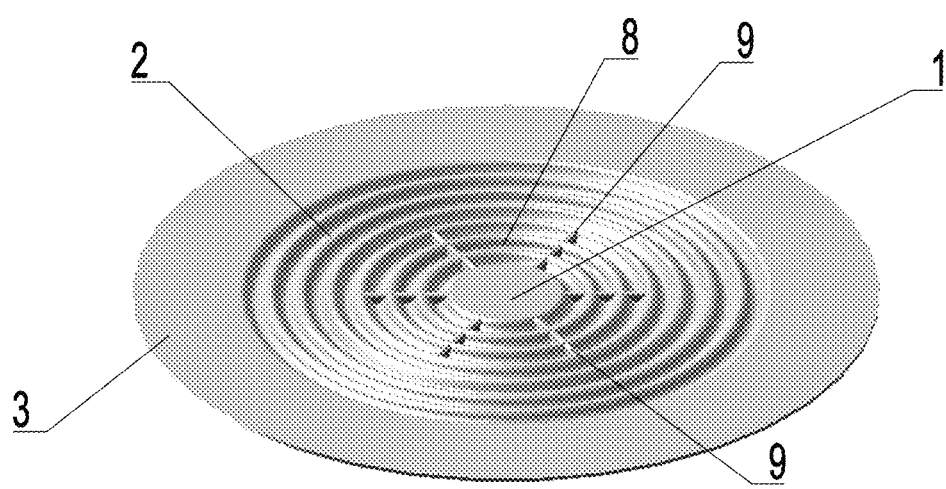

In contrast with the previously described control diaphragms, the control diaphragm in FIG. 8A and FIG. 8B also comprises radial reinforcing ribs 9, which start at the outer edge region of sensing region 1 and run radially outwards over the first three concentric corrugations 8 of functional region 2. The height of reinforcing ribs 9 can vary, but usually lies in the plane of sensing region 1. The reinforcing ribs, which like the concentric corrugations are moulded into the control diaphragm, lead to a local reinforcement of the diaphragm without increasing the mass. The degree of reinforcement can be influenced by the number, the length, the width and the height of the reinforcing ribs. Viewed from the represented side, the reinforcing ribs are constituted as elevations in the wave troughs. Viewed from the other side, the reinforcing ribs are constituted as indents in the wave troughs.

Figure 9A:
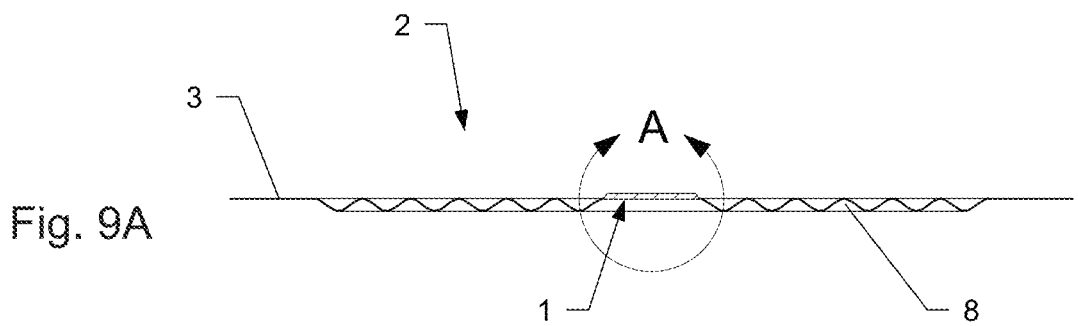
FIGS. 9A & 9B show a cross-sectional representation of a control diaphragm with a one-sided thickening.
Figure 9B:
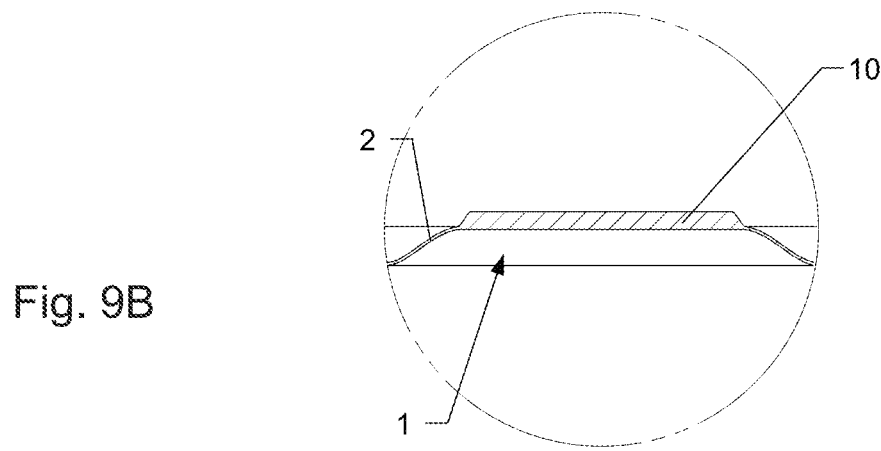
Figure 10A:
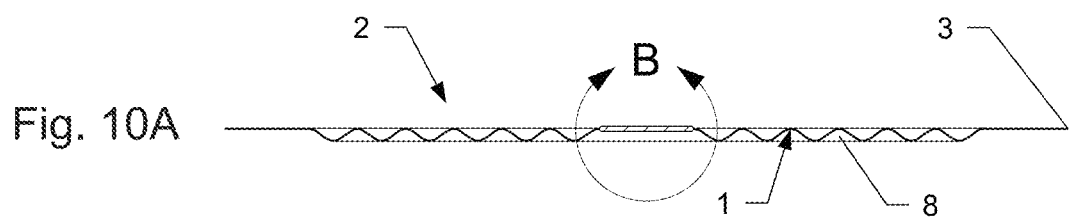
FIGS. 10A & 10B show a cross-sectional representation of a control diaphragm with a two-sided thickening.
Figure 10B:
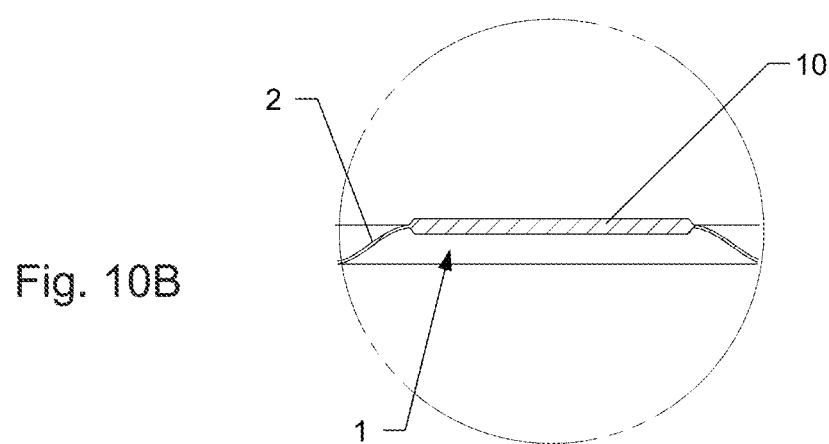

Two types of embodiment with a reinforcing means constituted as thickening 10 are shown in FIGS. 9A & 9B and 10A & 10B. FIGS. 9A and 10A show a cross-section through the entire diaphragm with fastening border 3, functional region 2 and sensing region 1. FIGS. 9B and 10B show in each case an enlarged detail of the sensing region of the control diaphragm. In FIGS. 9A & 9B, the reinforcing means in the sensing region is constituted as a one-sided thickening 10. The latter can be arranged on the side facing away from or facing towards the control lever. FIGS. 10A & 10B show a two-sided thickening of the sensing region.

Figure 11A:
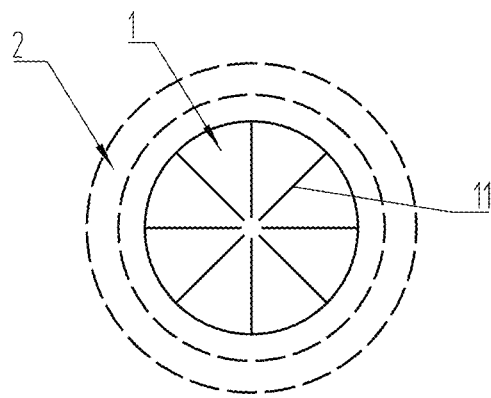
FIGS. 11A-11C show a diagrammatic representation of three variants of a radially reinforced sensing region.
Figure 11B:
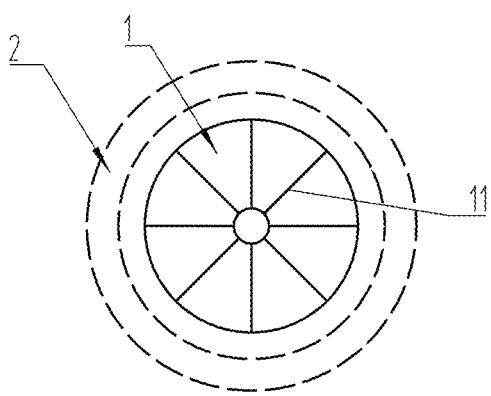
Figure 11C:
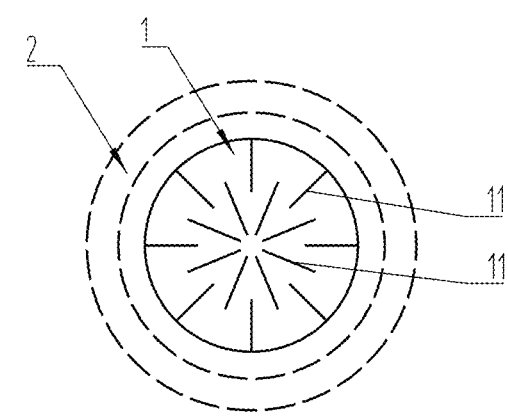

FIGS. 11A-11C show a diagrammatic representation of sensing region 1 of a control diaphragm with reinforcing means, which are constituted in the form of a plurality of radial reinforcing ribs (integrally moulded reinforcing means) and reinforcing corrugations (moulded-in reinforcing means). Three different arrangements are shown in FIG. 11A to 11C: (a) radial reinforcement ribs or reinforcing corrugations, which extend from the edge of the sensing region approximately into the centre of the sensing region; (b) as in (a) with an additional annular rib or corrugation in the centre; (c) a plurality of radial reinforcing ribs or reinforcing corrugations of differing length and offset with respect to one and other—in the variant shown, with an inner and an outer ring with in each case eight reinforcing ribs or corrugations.

In the variant shown, eight or sixteen reinforcing ribs or corrugations are shown in each case, wherein at least six are preferably present.

The reinforcing corrugations, in contrast with the reinforcing ribs, are wave-shaped "embossments" as in the case of the corrugations in the functional region (moulded-in reinforcing means). The latter can be produced for example by means of thermoforming processes. In this case, the thickness of the control diaphragm remains essentially the same also in the sensing region. The reinforcing ribs, on the other hand, are local thickenings of the diaphragm (integrally moulded reinforcing means).

Reinforcing ribs can have a maximum height of 10 to 500 micrometres, preferably 20 to 300 micrometres, relative to the plane of the sensing region. Reinforcing corrugations can have a maximum height or depth also of 10 to 500 micrometres, preferably 20 to 300 micrometres.

LIST OF REFERENCE NUMBERS 1 sensing region
2 functional region 3 fastening border
4 control lever
5 control chamber
6 reinforcing plate
7 fastening means
8 concentric corrugations
9 radial reinforcing ribs
10 thickening
11 radial reinforcing ribs or reinforcing corrugations

The invention claimed is:

1. A control diaphragm for controlling a supply of fuel in a diaphragm carburetor of an internal combustion engine, the control diaphragm comprising a central sensing region, a functional region enclosing the sensing region concentrically and a peripheral fastening border for fastening the control diaphragm in the diaphragm carburetor;
   wherein, in the installed state, the control diaphragm closes a control chamber of the diaphragm carburetor in a sealing manner and is operatively connected via the central sensing region to a control lever of the diaphragm carburetor arranged in the control chamber, the control lever sensing axial deflection of the sensing region in a manner which is dependent on an operation-induced pressure change in the control chamber;
   wherein:
   the control diaphragm consists in one piece of temperature-resistant and fuel-resistant, non-elastomeric plastic;
   the functional region is constituted by a multiplicity of concentric corrugations between the fastening border and the sensing region, wherein the outermost concentric corrugation directly adjoins the fastening border and the radius of the outermost concentric corrugation essentially corresponds to the radius of the control chamber;
   the sensing region directly adjoins the innermost concentric corrugation of the functional region and the radius of the sensing region corresponds to 5 to 25% of the outer radius of the functional region; and
   the sensing region comprises means for reinforcing the control diaphragm.

2. The control diaphragm according to claim 1, wherein the means for reinforcing is constituted by a thickening of the sensing region, wherein the thickness of the sensing region corresponds to 2 to 12 times the diaphragm thickness in the functional region.

3. The control diaphragm according to claim 1, wherein the sensing region has a maximum thickness of 10 to 500 micrometres.

4. The control diaphragm according to claim 1, wherein the means for reinforcing comprises radial reinforcing ribs and/or reinforcing corrugations in the sensing region.

5. The control diaphragm according to claim 4, wherein the reinforcing ribs and/or reinforcing corrugations have a maximum height of 10 to 500 micrometres.

6. The control diaphragm according to claim 1, wherein the diaphragm in the functional region has a thickness of 5 to 200 micrometres.

7. The control diaphragm according to claim 1, wherein four to ten concentric corrugations are formed in the functional region.

8. The control diaphragm according to claim 1, wherein the concentric corrugations are constituted wave-shaped in the radial direction and have an amplitude of 0.2 to 1.0 millimetres from wave crest to wave trough and/or a wavelength of 1.0 to 2.5 millimetres.

9. The control diaphragm according to claim 7, wherein the wavelength increases towards the central sensing region and/or the amplitude diminishes towards the central sensing region.

10. The control diaphragm according to claim 1, wherein the radius of the sensing region amounts to less than 20%.

11. The control diaphragm according to claim 1, wherein the radius of the sensing region amounts to 1 to 5 millimetres and/or the inner radius of the functional region amounts to 1 to 5 millimetres and the outer radius of the functional region amounts to the 10 to 20 millimetres.

12. The control diaphragm according to claim 1, wherein a plurality of radial reinforcing ribs are constituted in the functional region.

13. The control diaphragm according to claim 1, wherein the control diaphragm is made of a plastic with a temperature resistance of at least 150°, selected from the group of polybenzimidazole (PBI), polyimides (PI), thermoplastic polyimides (TPI), polyamide-imide (PAI), polyether sulphone (PES), polyphenyl sulphone (PPSU), polyether imide (PEI), polysulphone (PSU), polyether ketone (PEK), polyaryletherketone (PAEK), polyphenylene sulphide (PPS), perfluoroalkoxy polymer (PFA), ethylene tetrafloroethylene (ETFE), polychlorine trifloroethylene (PCTFE), polyvinylidene fluoride (PVDF), polybutylene terephthalate (PBT), polyetheretherketone (PEEK) or combinations thereof.

14. The control diaphragm according to claim 1, wherein the plastic has a modulus of elasticity measured according to DIN EN ISO 527 of more than 800 N/mm$^2$.

15. A diaphragm carburetor with the control diaphragm according to claim 1.

16. The control diaphragm according to claim 2, wherein the means for reinforcing is constituted by a thickening of the sensing region, wherein the thickness of the sensing region corresponds to 4 to 8 times the diaphragm thickness in the functional region.

17. The control diaphragm according to claim 5, wherein the reinforcing ribs and/or reinforcing corrugations have a maximum height of 20 to 300 micrometres.

18. The control diaphragm claim 12, wherein the plurality of radial reinforcing ribs extend only over the innermost concentric corrugations.

19. A control diaphragm for controlling a supply of fuel in a diaphragm carburetor of an internal combustion engine, comprising a central sensing region, a functional region enclosing the sensing region concentrically and a peripheral fastening border for fastening the control diaphragm in the diaphragm carburetor;
   wherein, in the installed state, the control diaphragm closes a control chamber of the diaphragm carburetor in a sealing manner and is operatively connected via the central sensing region to a control lever of the diaphragm carburetor arranged in the control chamber, which control lever senses the axial deflection of the sensing region in a manner which is dependent on an operation-induced pressure change in the control chamber;
   wherein:
   the control diaphragm consists in one piece of temperature-resistant and fuel-resistant, non-elastomeric plastic;
   the functional region is constituted by a multiplicity of concentric corrugations between the fastening border and the sensing region, wherein the outermost concentric corrugation directly adjoins the fastening border and the radius of the outermost concentric corrugation essentially corresponds to the radius of the control chamber;

the sensing region directly adjoins the innermost concentric corrugation of the functional region and the radius of the sensing region corresponds to 5 to 25% of the outer radius of the functional region; and the sensing region includes radial reinforcing ribs and/or reinforcing corrugations.

20. A diaphragm carburetor having a control diaphragm, the control diaphragm comprising:

a central sensing region, a functional region enclosing the sensing region concentrically and a peripheral fastening border for fastening the control diaphragm in the diaphragm carburetor, wherein, in the installed state, the control diaphragm closes a control chamber of the diaphragm carburetor in a sealing manner and is operatively connected via the central sensing region to a control lever of the diaphragm carburetor arranged in the control chamber, the control lever sensing the axial deflection of the sensing region in a manner which is dependent on an operation-induced pressure change in the control chamber;

wherein the control diaphragm consists in one piece of temperature-resistant and fuel-resistant, non-elastomeric plastic;

wherein the functional region is constituted by a multiplicity of concentric corrugations between the fastening border and the sensing region, wherein the outermost concentric corrugation directly adjoins the fastening border and the radius of the outermost concentric corrugation essentially corresponds to the radius of the control chamber;

wherein the sensing region directly adjoins the innermost concentric corrugation of the functional region and the radius of the sensing region corresponds to 5 to 25% of the outer radius of the functional region; and wherein the sensing region includes means for reinforcing the control diaphragm.

* * * * *